United States Patent [19]
Durieux

[11] 3,938,712
[45] Feb. 17, 1976

[54] APPARATUS FOR MEASURING OUT PULVERULENT MATERIALS

[75] Inventor: Teddy Durieux, Jemeppe-sur-Sambre, Belgium

[73] Assignee: Solvay & Cie, Brussels, Belgium

[22] Filed: Mar. 26, 1974

[21] Appl. No.: 454,799

[30] Foreign Application Priority Data
Mar. 26, 1973 France .............................. 73.10851

[52] U.S. Cl. ................ 222/404; 417/900; 425/208
[51] Int. Cl.² ......................................... G01F 11/00
[58] Field of Search ............... 222/404, 413; 259/2; 417/900; 425/208

[56] References Cited
UNITED STATES PATENTS
383,556  5/1888  Brainard .............................. 198/213
3,023,455  3/1962  Geier et al. .......................... 259/2 X FOREIGN PATENTS OR APPLICATIONS
258,283  12/1967  U.S.S.R. .............................. 222/413

Primary Examiner—Stanley H. Tollberg
Assistant Examiner—Hadd Lane
Attorney, Agent, or Firm—Spencer & Kaye

[57] ABSTRACT

In apparatus for measuring out pulverulent materials, including a screw rotatably mounted in a barrel having an outlet at one end, the ability of the apparatus to impart a uniform flow rate to materials having poor flow properties is improved by interrupting the thread of the screw between any two circumferentially spaced generatrices of the cylindrical surface thereof and by disposing scraping elements to cooperate with the screw thread.

5 Claims, 4 Drawing Figures

APPARATUS FOR MEASURING OUT PULVERULENT MATERIALS

BACKGROUND OF THE INVENTION

The present invention relates to an apparatus for measuring out pulverulent materials, in which a screw is used.

Numerous devices for conveying and measuring out pulverulent materials are known. For example, measuring devices employing vibrations, automatic balances equipped with endless conveyor belts, funnels with a perforated base equipped with bladed wheels and the like have been described, for example in the periodical Fette, Seifen, Anstrichmittel, 56, No. 5, 1954, p. 321 to 325.

It is also known to use screw conveyors of various types for conveying pulverulent materials as disclosed in the article by H. W. Cremer and S. B. Watkins in Chemical Engineering Practice, 1957, vol. 3, p. 406 to 410. Devices of this type can also be suitable, in some cases, for the approximate measuring out of pulverulent materials.

Nevertheless, if the materials to be measured out are in the form of sticky powders or powders with mediocre flow properties, or if they are in the form of granules which have a tendency to agglomerate, it often happens that the agglomeration of the material between the teeth of the screw leads to clogging and blocking of the latter. It is then necessary to dismantle the apparatus in order to clean it. Moreover, the measuring is wholly lacking in precision.

These disadvantages are particularly objectionable when such an apparatus is intended to feed a reactor in a uniform manner with a catalyst or a reactive solid possessing these mediocre morphological characteristics. In fact, uneven feeding can, in this case, have a very detrimental effect on the way in which the chemical reaction takes place, on the yield of the product obtained and on the quality of the latter.

SUMMARY OF THE INVENTION

It is an object of the present invention to measure out pulverulent materials in a uniform manner, while avoiding the problems inherent in the screw devices of the prior art.

These and other objects of the present invention are achieved by an apparatus for measuring out pulverulent materials, which includes a screw positioned in a barrel open at at least one of its ends, in which the thread of the screw is interrupted between any two generatrices of the latter and the thread of the screw cooperates with scraping means.

The measuring apparatus which is the subject of the invention is fed with pulverulent material by means of any suitable device, for example by means of a hopper or a cylindricalconical funnel. In this case, the funnel is positioned so that its lower orifice opens preferably above and near the end of the screw conveying the material.

This orifice may have any cross section whatsoever; it is generally chosen as a function of the quantity of material to be measured out and of its morphology. In order to prevent it from becoming clogged, it is preferred to use an orifice with an elliptical cross section. The material can be introduced into the measuring apparatus in any form whatsoever, for example in the form of small balls, cubes, powder, granules and the like. If the material is not in a pulverulent form, it undergoes grinding between the screw and the walls of the barrel when it is introduced into the measuring apparatus.

As mentioned above, the measuring apparatus which is the subject of the invention comprises a screw. This screw is positioned inside the barrel so as to form a turning arrangement between the screw and the barrel. In general, the longitudinal axes of the screw and of the barrel lie in a horizontal plane.

When the measuring apparatus is in operation, the screw executes a rotational movement about its longitudinal axis. The means intended to provide this rotational movement may be of any type. Most generally, use is made of an electric motor whose drive shaft drives the screw, or a shaft coupled to the screw, via a transmission device which functions by means of pulleys and a belt, gears, friction and the like.

It is also possible to install a speed-reduction device between the drive shaft and the screw or the receiving shaft. The thread of the screw intended to convey the material through the measuring apparatus is in the form of a spiral groove of any profile whatsoever. This profile is, for example, triangular, square, round or trapezoidal. The pitch of the thread can also have any value whatsoever but its direction is obviously chosen so that the material travels towards the discharge end of the apparatus, taking into account the direction of rotation of the screw. Thus, if an observer, standing at the discharge end, sees the screw turn in the counterclockwise direction, the pitch of the thread must be left-handed, and vice versa. The thread can have a variable pitch or a multiple pitch. The screw is generally threaded over its entire length.

The material flowing through the lower orifice of the feed device is thus prevented from becoming agglomerated in the barrel upstream from this orifice, as could happen in the case where the feed device was not mounted at the end of the screw.

One of the characteristics of the apparatus according to the invention resides in the fact that the thread of the screw is interrupted between any two generatrices of the latter.

The side surface of the screw consequently possesses two zones, namely a threaded zone and a smooth zone. The smooth zone is a portion of a cylinder, the radius of which is equal to the distance from the thread roots of the threaded zone to the axis of the screw. Thus, the smooth zone of the surface coincides with, and defines, the side root surface of the screw.

Preferably, the generatrices of the screw between which the thread is interrupted are diametrically opposite. It is preferred to use a screw whose thread is interrupted over its entire length. This makes it possible to convey the material more uniformly. In this preferred case, the smooth zone occupies half of the side surface of the screw. However, it is still more advantageous to use a screw which is threaded around its entire periphery in the region thereof which is situated between the discharge end of the apparatus and the scraping means to be described below. The screw is thus prevented from being damaged as a result of possible decentering in the barrel, due to pressure of the material at the sides.

The diameter of the barrel, the size of the pitch, the length and the rotational speed of the screw, and thus the capacity of the measuring apparatus are obviously chosen as a function of the nature and the quantity of material to be conveyed. In general, the size of the pitch, that is to say the distance separating two consecutive thread crests, does not exceed the diameter of the barrel.

When the measuring apparatus which is the subject of the invention is in operation, the solid material coming from the suitable feed device is carried along with a discontinuous rectilinear i.e. straight-line, translational movement, as a result of the rotation of the screw. In fact, it travels through the barrel when it is in contact with the threaded zone of the screw and remains motionless when it is in contact with the smooth zone of the latter.

As mentioned above, the apparatus according to the invention also comprises scraping means which cooperate with the thread of the screw. These scraping means are such that they make it possible to scrape at least one space lying between two consecutive crests of the screw thread, and preferably to scrape the entire threaded zone lying between the lower orifice of the feed device and the discharge end of the apparatus. In this way, the pulverulent material which agglomerates between the teeth of the thread as it moves through the barrel, is detached easily, thus ensuring that it is measured out uniformly.

The above-mentioned scraping means can be fixed or mobile and are located at any position whatsoever on the portion of the side surface of the barrel lying between the lower orifice of the feed device and the discharge end of the apparatus. In the case of mobile scraping means, such means can include, for example, a rod equipped with one or more points perpendicular to the axis of the rod, or a comb whose teeth have a profile of the screw thread, the distance between these points or these teeth being equal to, or a multiple of, the pitch of the screw thread. Any other similar scraping means can also be provided. These mobile scraping means, equipped with a device which tends to pull them back, such as, for example, a spring, can advantageously be positioned opposite a groove provided in the barrel of the apparatus, parallel to the longitudinal axis of the latter, so that they can travel parallel to this axis and mesh between two or more crests of the screw thread.

When the apparatus is in operation, the scraping means are driven with a uniform rectilinear, or straight line, movement, parallel to the longitudinal axis of the barrel, as a result of the rotation of the screw, as soon as the scraping means mesh in the threaded zone of the screw. This ensures efficient scraping of this zone. The scraping means then return to their original position, under the effect of the device which tends to pull them back, as soon as they leave this zone. They remain in this original position as long as they are opposite the smooth zone, and these movements are repeated each time the screw revolves.

It is also possible to equip the apparatus according to the invention with fixed scraping means. This constitutes a preferred embodiment, particularly when the apparatus is intended for measuring out pulverulent materials which must be conveyed in the absence of atmospheric agents. Moreover, the wear caused by friction between the scraping means and the threaded zone of the screw is considerably reduced.

In the case where fixed scraping means are used, the latter can be designed in the same way as the mobile scraping means described above, but are fixed on the barrel of the apparatus in such a way as to make it easier to render the apparatus leakproof. Still more simply, it is possible to attach to the internal surface of the barrel one or more teeth lined up along an axis parallel to the longitudinal axis of the barrel, spaced the same distance apart as the teeth or the points of the fixed scraping means mentioned above, and with a profile such that each tooth meshes, preferably without friction, to occupy substantially the entire space between two consecutive crests of the screw thread.

When the apparatus according to the invention is equipped with fixed scraping means, it is absolutely necessary that the screw should mesh correctly between the teeth or the points of the scraping means. When the apparatus is in operation, it is thus necessary to be able to combine the rotational movement of the screw with a reciprocating rectilinear translational movement along the axis of the screw, so that the screw occupies the same position in the barrel after each complete revolution. This reciprocating rectilinear movement can be resolved into two movements in opposite directions and of the same amplitude. The amplitude of these movements and the respective fractions of a revolution executed by the screw during which these movements take place are a function of the surface area occupied by the threaded zone.

Thus, when the screw generatrices between which the thread is interrupted are diametrically opposite, in accordance with the preferred embodiment of the invention, that is to say when the screw is threaded over half its circumference, the amplitude of the reciprocating rectilinear translational movement of the screw must be equal to half a pitch of the thread and a reversal of the direction of the movement must take place at each half revolution of the screw, i.e. as soon as the threaded zone comes into contact with the scraping means and as soon as it leaves the said scraping means.

It is obvious that the direction of rotation of the screw and the direction of the pitch of the thread determine the direction of the translational movement of the screw when the threaded zone comes into contact with the scraping means.

All the means which can impart to the screw the reciprocating rectilinear translational movement defined above can be used in conjunction with the means intended to rotate the said screw. For example, it is possible to control this movement by means of a device comprising a cam with a particular profile and a return spring which acts on the end of the screw or on a shaft into which the screw is fitted. The profile of this cam must obviously be calculated so that it causes the screw to execute two movements in opposite directions and of the same amplitude during the requisite fractions of a revolution, the return spring being intended to ensure permanent contact between the screw or the shaft and the roller path of the cam.

It is also possible to control this movement by providing, on the entire periphery of the non-threaded side surface of the screw or of the side surface of a shaft into which the screw is fitted, a groove with a particular profile into which a fixed lug is inserted. The profile of this groove, like that of the cam mentioned above, must be designed so as to make it possible for the screw to execute two movements in opposite directions and of the same amplitude during the requisite fractions of a revolution. The position of the fixed lug must be decided so that the change in the direction of travel of the screw in the barrel takes place at the instant when the threaded zone meshes with the fixed scraping means.

The apparatus according to the invention can be used for measuring out any solid materials with mediocre flow properties, and particularly sticky powders or granules which have a tendency to agglomerate. It can be used, inter alia, for conveying filtration cakes, various pulps, moist ashes, clay and the like, in a uniform manner. It finds a valuable utility in manufacturing units where it is necessary to measure out solids used as reagents or catalysts (metal oxides, silica gels and the like). Very advantageous results have been recorded in units for manufacturing olefinic polymers employing the known techniques of low pressure catalytic polymerization, particularly when the latter is carried out in the presence of catalysts comprising a solid (reduced transition metal halide and supported catalyst). This applies, for example, to catalysts comprising the product of the reaction between a halogenated derivative of a transition metal and a phenate of a divalent metal, as described in Belgian Pat. No. 743,325 in the name of the present assignee.

The scope of the invention will be better understood with the help of the description of a practical embodiment, which now follows. This description is given by way of illustration and refers to FIGS. 1 to 3.

The material to be measured out is a solid catalyst produced by reacting $TiCl_4$ with a magnesium phenate. This solid is used in conjunction with a trialkyl-aluminum for the catalytic polymerization of ethylene at low pressure and in suspension in an inert hydrocarbon diluent. This solid is in the form of a very fine powder with mediocre flow properties which it is very difficult to convey uniformly by means of a conventional screw device.

DESCRIPTION OF THE PREFERRED EMBODIMENTS

Figure 1:
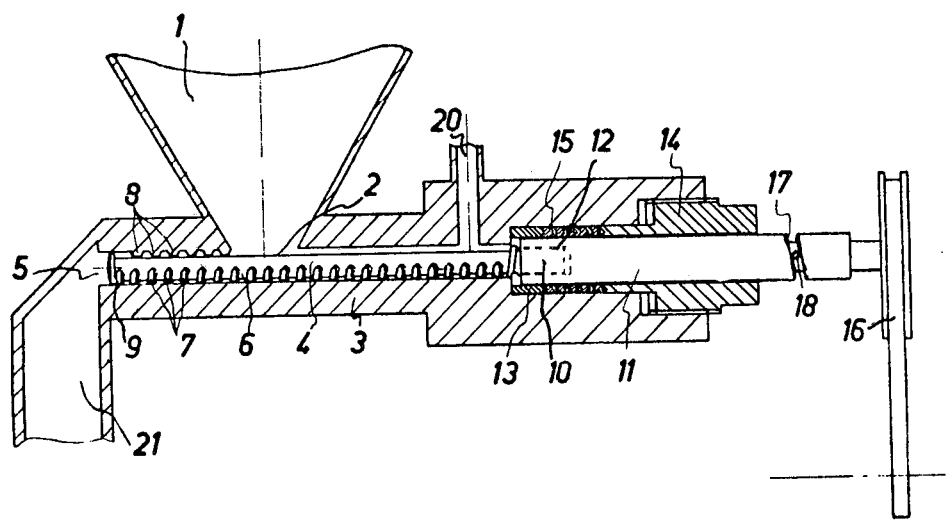
FIG. 1 is an elevational view of a complete device constructed according to the invention, the barrel of which is cut through a vertical plane.

In FIG. 1, the feed device is represented in cross section by a conical funnel 1, the orifice 2 of which is an ellipse, which is not shown. Material introduced into the apparatus via the funnel 1 falls by gravity into a barrel 3 and is carried along toward the discharge end thereof due to the rotation of a screw 4, which turns in the counterclockwise direction, with reference to an observer standing at the discharge end 5. The pitch of the thread 6 of screw 4 is left-handed.

Figure 1A:
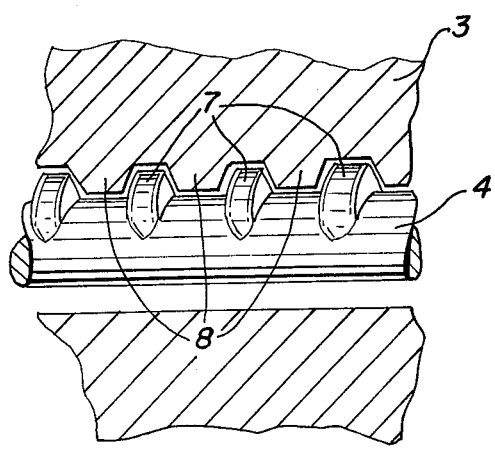
FIG. 1a is a detail view, partly in cross section and to a larger scale, of a portion of the device of FIG. 1.

The thread of the screw 4, as represented in FIG. 1, is interrupted between two generatrices of the screw 4 which are diametrically opposite and which, in FIG. 1, lie in a horizontal plane passing through the longitudinal axis of this screw. As is shown most clearly in FIG. 1a, the teeth 7 of the thread 6 have a trapezoidal profile similar to that of the hollows lying between each tooth 8 of the barrel 3. The end 9 of the screw 4 is threaded over its entire periphery over a length approximately equal to twice the thread pitch.

Figure 2:
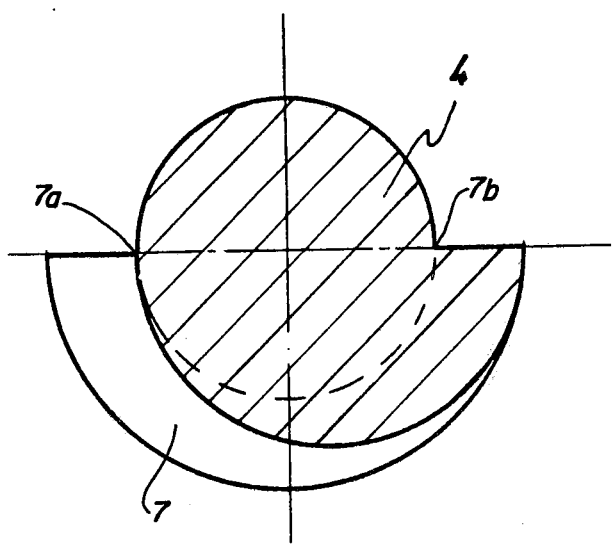
FIG. 2 is a cross-sectional view, along an axial plane, of the screw of FIG. 1.

FIG. 2, which represents an enlarged cross section of the screw 4 through a vertical plane passing through the crest of a tooth 7, shows the cross section of the threaded and smooth zones, the threads being interrupted between diametrically opposed generatrices 7a and 7b.

Returning to FIG. 1, it is seen that the end 10 of the screw is screwed into a shaft 11 by means of a thread 12, the pitch of which is in the opposite direction to the thread 6, in order to ensure secure coupling between the screw 4 and the shaft 11 as they rotate. The shaft 11 turns between two bearings 13 and 14 between which there is disposed a packing 15 in the form of a herringbone joint, and is driven by a belt 16 in the above-mentioned direction of rotation, the belt being set in motion by a motor connected to a speed-reduction device (not shown).

In order to ensure correct meshing of the screw 4 between the teeth 8 of the barrel 3, the shaft 11 is equipped with a groove 17, inclined relative to the vertical in the opposite direction to the pitch of the thread 6, and into which a fixed lug 18, shown in cross section, is inserted.

FIG. 1 represents the entire apparatus when the screw 4 still has a quarter of a revolution to make in the above-mentioned direction before the teeth 7 mesh between the teeth 8 of the barrel 3.

Figure 3:
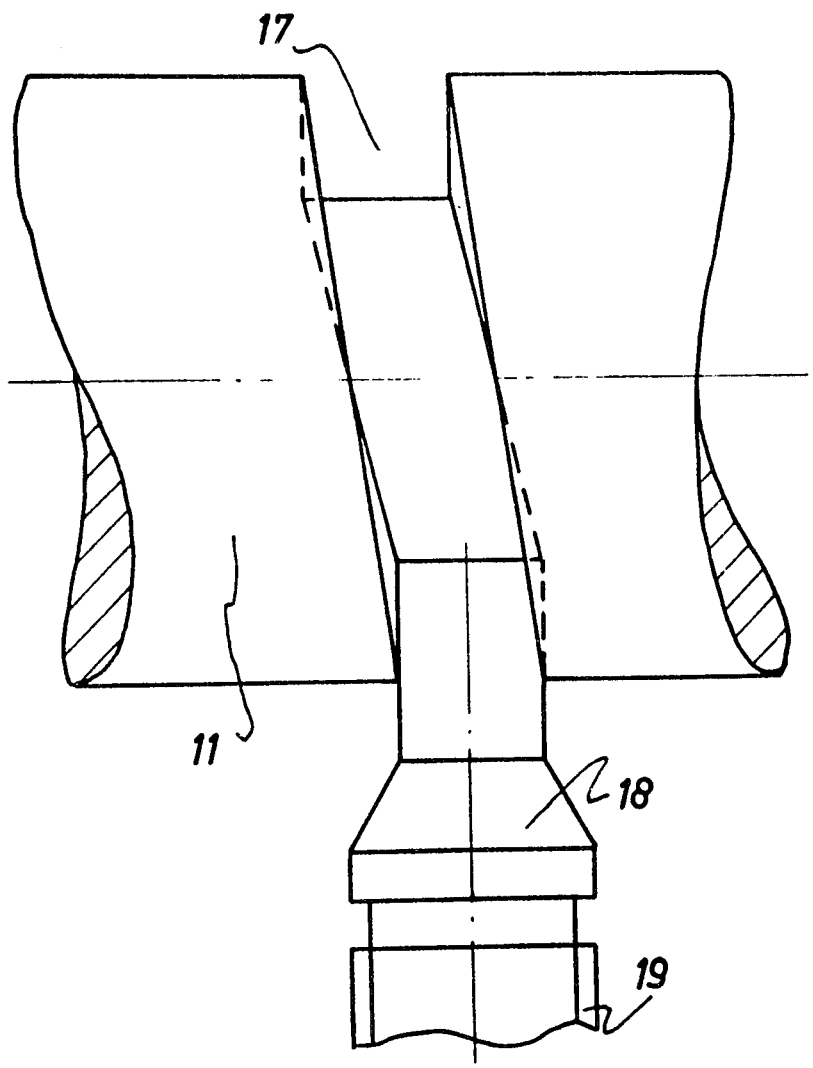
FIG. 3 is a detail plan view of the device which provides the rectilinear translational movement of the screw represented in FIG. 1.

FIG. 3 is an enlarged plan view of a part of the shaft 11, the groove 17 and the lug 18 after the screw 4 has made this quarter of a revolution, that is to say at the instant when the teeth 7 of the screw 4 begin to mesh between the teeth 8 of the barrel 3. When the shaft 11 turns through half a revolution in the above-mentioned direction from the position represented in FIG. 3, the shaft 11 and thus the screw 4 move back through the barrel 3 over a distance equal to half a pitch of the thread 6.

During the subsequent half-revolution of the shaft 11, during which the teeth 7 no longer mesh between the teeth 8, shaft 11 and thus the screw 4 move forward through the barrel 3 over a distance equal to half a pitch of the thread 6 until the shaft 11 again occupies the position indicated in FIG. 3, and so on for each successive half-revolution of the shaft 11. The amplitude of the reciprocating rectilinear translational movement which the screw 4 executes is thus equal to half a pitch of the thread 6. It is thus apparent that, for each complete revolution of the screw 4, the solid material moves forward through the barrel 3 over a distance equal to one pitch of the thread 6.

As FIG. 3 shows, the lug 18 can be equipped with a thread 19 to enable it to be screwed into a bore provided in a fixed support on the outer wall of the barrel. This support can advantageously be equipped with a device which makes it possible to slide it over the outer wall of the barrel, so as to adjust the position of the lug with precision in order to ensure correct meshing of the teeth 7 of the screw 4 between the teeth 8 of the barrel 3. The support and the optional device which makes it possible to slide it are not shown in the figures.

The pipeline 20 represented in FIG. 1 is not absolutely necessary. It is however desired in the case of measuring out solid catalysts conveyed in accordance with the practical embodiment described above, in order to make it possible to flush the internal portion of the barrel with an inert gas.

When the solid reaches the dishcarge end 5 of the barrel, it falls via the pipeline 21 into a constant level tank containing the inert diluent for polymerization, not shown in the figures.

The technical advance provided by the apparatus according to the invention resides, as was stated above, in the possibility of measuring out, in a uniform manner, solid materials which are sticky or which have a tendency to agglomerate. In the case of the practical embodiment described above, the catalytic polymerization of ethylene, monitored in accordance with the control principle described in Belgian Pat. No. 717,650 in the name of the present assignee, could be carried out with a monomer feed rate (adjusted automatically as a function of the flow rate of unreacted monomer) which was remarkably constant. Now, this is the case for a catalyst, the productivity of which does not vary with time, all the other polymerization conditions remaining the same, if the catalyst is introduced uniformly into the polymerization chamber. Diagrams showing the ethylene feed rate in the case where this same catalyst is introduced into the polymerization chamber by means of a conventional screw device and then by means of an apparatus according to the invention, show that only the latter makes it possible, due to the uniform introduction of the catalyst, to retain a constant feed rate of ethylene and thus to manufacture a polymer with constant properties.

It will be understood that the above description of the present invention is susceptible to various modifications, changes and adaptations, and the same are intended to be comprehended within the meaning and range of equivalents of the appended claims.

I claim:

1. In apparatus for measuring out pulverulent materials, which apparatus includes a screw presenting a side root surface and positioned, and rotatably mounted, in a barrel open at at least one of its ends, the improvement wherein the thread of said screw extends from said surface and is interrupted between only two diametrically opposite generatrices of the latter for causing said side surface to consist of a single threaded zone and a single smooth zone, and said apparatus further comprises fixed scraping means cooperating with said threaded zone of said screw, said fixed scraping means comprising several teeth lined up along an axis parallel to the longitudinal axis of the barrel, the distance between said teeth being equal to, or a multiple of, the pitch of the thread, each of said teeth having a profile such that it meshes with, and occupies substantially the entire space between, two consecutive threads of said screw, and drive means to rotate and reciprocate said screw in order to allow said threads to synchronously mesh with said teeth of said scraping means.

2. Apparatus according to claim 1 wherein the thread is so interrupted at least over the portion of the length of said screw outside of the region lying between the open end of the barrel and the location of said scraping means.

3. Apparatus according to claim 1 wherein said scraping means are constructed to act at least between two consecutive crests of the thread of said screw.

4. Apparatus according to claim 1 wherein said drive means permits imparting to the screw a reciprocating rectilinear translational movement whose amplitude in each direction is equal to half a pitch of the thread.

5. Apparatus according to claim 1 wherein said drive means comprises a shaft into which the screw is fitted, with the side surface of said shaft being provided with a groove, and a fixed lug inserted into said groove.

* * * * *